(No Model.) 3 Sheets—Sheet 1.

H. N. BERRY.
PLANING AND SIZING MACHINE.

No. 452,659. Patented May 19, 1891.

WITNESSES:
Fred G. Dieterich
Edw. W. Byrn

INVENTOR:
H. N. Berry.
BY Munn & Co.
ATTORNEYS (No Model.) 3 Sheets—Sheet 2.

H. N. BERRY.
PLANING AND SIZING MACHINE.

No. 452,659. Patented May 19, 1891.

WITNESSES:
Fred G. Dieterich
Edw. W. Byrn

INVENTOR:
H. N. Berry.
BY Munn & Co.
ATTORNEYS (No Model.) 3 Sheets—Sheet 3.
H. N. BERRY.
PLANING AND SIZING MACHINE.

No. 452,659. Patented May 19, 1891.

WITNESSES:
Fred G. Dieterich
Edw. W. Byrn

INVENTOR:
H. N. Berry.
BY Munn & Co
ATTORNEYS

UNITED STATES PATENT OFFICE.

HIRAM NEWTON BERRY, OF MERIDIAN, MISSISSIPPI, ASSIGNOR OF ONE-HALF TO MICAJAH F. BERRY, OF SAME PLACE.

PLANING AND SIZING MACHINE.

SPECIFICATION forming part of Letters Patent No. 452,659, dated May 19, 1891.

Application filed June 18, 1890. Serial No. 356,017. (No model.)

*To all whom it may concern:*

Be it known that I, HIRAM NEWTON BERRY, of Meridian, in the county of Lauderdale and State of Mississippi, have invented a new and useful Improvement in Planing and Sizing Machines, of which the following is a specification.

The object of my invention is to provide a machine adapted to receive the lumber from the saw-mill on live-rollers and to reduce the same to exact transverse sizes and plane the surface of the same as it passes through.

The invention is designed for use in connection with any saw-mill sawing green or dry lumber. It is also intended for sizing and planing dry lumber of any width or thickness, reducing it to uniform size, and may be used as a separate machine disconnected from any saw-mill.

Figure 1:
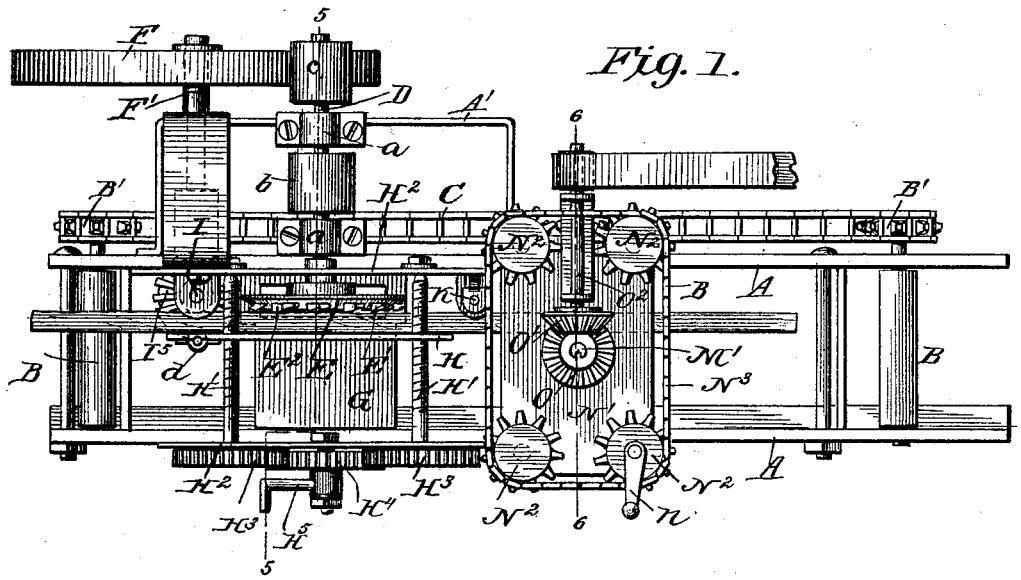
Figure 2:
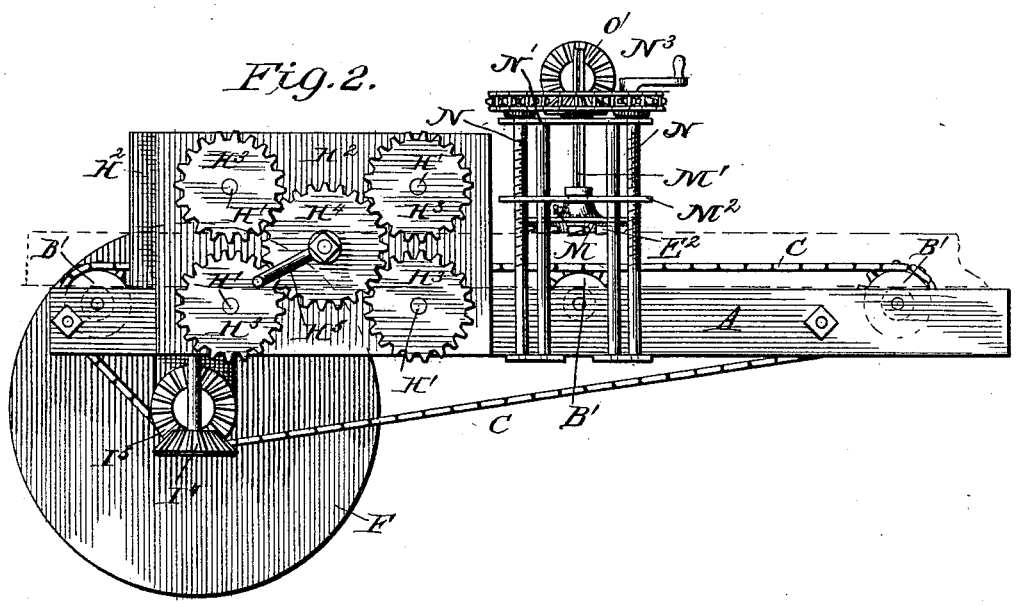
Figure 3:
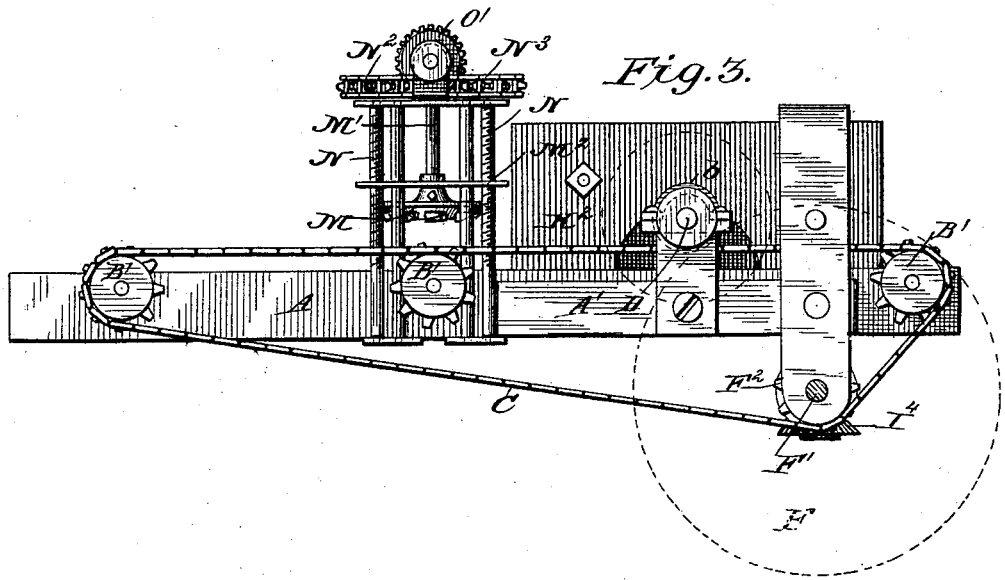
Figure 4:
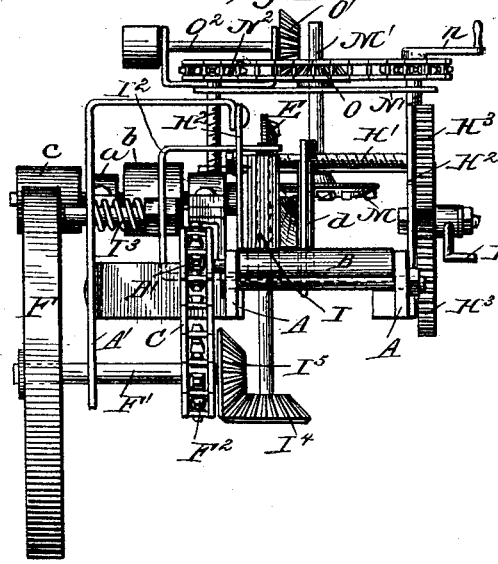
Figure 5:
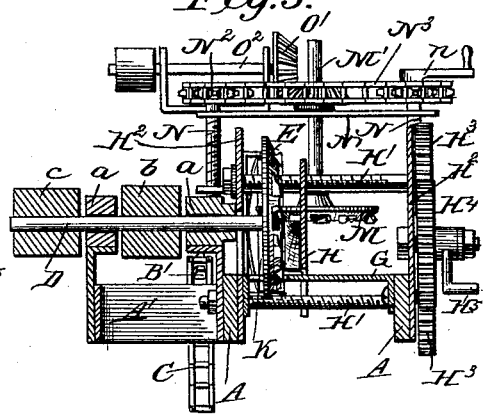
Figure 6:
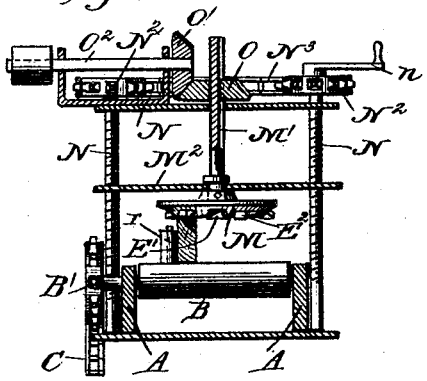
Figure 7:
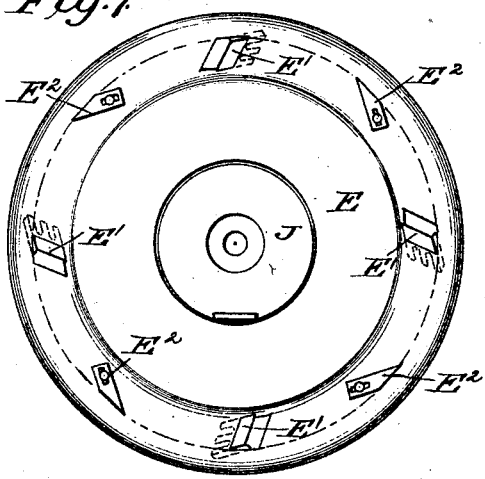
Figure 8:
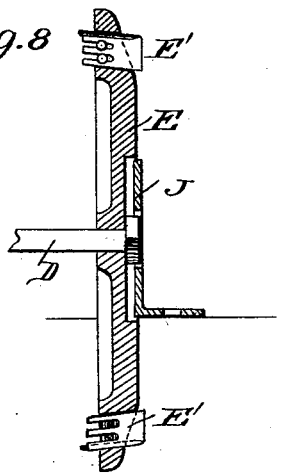
Figure 9:
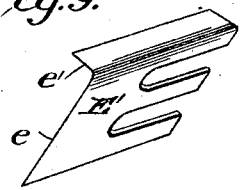
Figure 10:

Figure 1 is a plan view. Fig. 2 is a side elevation. Fig. 3 is a side elevation from the opposite side to that shown in Fig. 2. Fig. 4 is an end elevation. Fig. 5 is a vertical transverse section through line 5 5 of Fig. 1. Fig. 6 is a vertical transverse section through line 6 6 of Fig. 1. Fig. 7 is a face view of the planer-disk. Fig. 8 is a central section of the same, and Figs. 9 and 10 are detail views in perspective of the planer-knives.

In the drawings, A A represent two horizontal parallel beams, which constitute the main frame of the machine, and between which is journaled the horizontal feed-rollers B, which carry the lumber through the machine. These feed-rollers have at their ends chain-wheels B', which are geared together and driven by a chain C.

D is the main shaft or driving-mandrel of the vertical planer-disk E. This shaft is journaled at $a$ $a$ in a side frame A' and carries a band-pulley $b$, through which power is transmitted to the machine from a belt connecting with any suitable motor. On the outer end of this planer-mandrel is a small friction-pulley $c$, which is in frictional contact with a large friction-wheel F, fixed upon a short shaft F', arranged parallel with the mandrel and bearing a chain-wheel $F^2$, Fig. 3, which imparts motion to the chain C of the feed-rollers. Just in front of the planer-disk E is a horizontal table-surface G, upon which the edge of the board rests in being fed past the planer-disk, and above this table-surface is arranged a vertical back-plate H, which holds the board up to the planer-disk, and which back plate is made adjustable to or from the planer-disk, as follows:

H' H' H' H' are four screw-shafts whose threaded portions are tapped through threaded holes in the vertical plate H, and whose ends swivel in the vertical fixed plates $H^2 H^2$, so that the shafts cannot move endwise. On the outer ends of the screw-shafts are keyed four gear-wheels $H^3 H^3 H^3 H^3$, and in mesh with them all is a central gear-wheel $H^4$, having a crank $H^5$, by turning which an equal motion is transmitted to all four of the screw-shafts, and the vertical back plate H is made to advance to or recede from the planer-disk in a perfectly true and parallel position thereto.

Just before the board is delivered to the planer-disk it is fed between a plane or smooth roller $d$, Figs. 1 and 4, set vertically in the plate H, and a corrugated roller I, which is set in a spring-seated frame consisting of a bracket $I^2$, having a horizontal stem surrounded by a spiral spring $I^3$, which causes the corrugated roller to be advanced against the board with an elastic pressure. This corrugated roller is actively driven, and serves to feed the board past the planer. For this purpose this roller has upon the lower end of its shaft a bevel-gear $I^4$, which meshes with and receives motion from a bevel-gear $I^5$ on the end of the shaft of the friction-wheel, which drives the main feed-rollers.

In constructing the planer-disk E its outer periphery is beveled or recessed upon its face, (see Fig. 8,) and cutter-knives E' of a peculiar shape, are set therein obliquely and alternate with cutters $E^2$. The cutter-knives E' (see Fig. 9) have a straight cutting-edge $e$, and also a right-angular or curved cutting-edge $e'$. This knife is set in a slat obliquely to the plane of the disk with the curved edge $e'$ extending outwardly from the center and projecting at the space where the outer face of the disk is recessed or cut away. This part $e'$ of the knife first meets and cuts away any inequality in the lumber, reducing it to a uniform size or thickness, while the inner or straight blade e of the knife acts as a surfacer and planes the board smooth. In other words, the knife cuts both upon the face and the periphery of the disk. These knives have slots in their rear portions, by which they are permitted to be fastened in the disk by means of set-screws. The cutters $E^2$ are chisel-shaped, and their cutting-edges are at right angles to the plane of the disk. These cutters alternate with $E'$, and are also secured by means of set-screws which pass through their slots. These latter cutters serve to assist in cutting off the inequalities of the boards, in order to bring them to a uniform transverse dimension. To make the function of the peculiar shape and arrangement of these two cutters more clear, I would state that the edge $e$ of cutter $E'$, operating in the plane of the face of the disk, cleaves or splits the wood in a direction lengthwise of the grain. In order to counteract the tendency of the cleavage to follow the grain of the wood, the part $e'$ and cutter $E^2$, whose cutting-edges are at right angles with reference to the cutting-edge $e$, are arranged to operate in advance of the said edge $e$ and sever the wood across the grain, and hence determine the length of the cleavage made by said edge $e$, and prevent further splitting. The part $e'$ also cuts away such thickness of chip as the part $e$ could not deal with. The other cutter $E^2$, acting in the circle of the cutting-edge $e'$ of cutter $E'$, prevents the choking of the cutter $E'$ by doing the principal part of the cutting transversely to the grain necessary to effect the reduction of the lumber to proper size. The center of the planer-disk is recessed, and in this recess lies a bed-guide J, Fig. 8, of circular shape, which is supported upon the table below. As the lumber approaches the bed-guide the cutters take off the inequalities, and, these being cut off, the bed-guide lies against the trued face of the board and guides the board straight to the spring-seated vertical bearing-roller K, Fig. 1, on the other side of the plane-disk. The lumber now passes to a second planedisk M, Figs. 5 and 6, which rests in a horizontal plane above the board and serves to dress the top edge of the lumber. This planerdisk is constructed substantially like the first, and it is fixed to a shaft $M'$, which swivels in a horizontal plate $M^2$, and which plate is made vertically adjustable, as follows:

N N N N are four vertical screw-shafts whose screw-threads are tapped through screw-threaded holes in the vertically-adjustable plate that carries the cutter. These screw-shafts swivel in fixed plates below, and also in a fixed horizontal plate $N'$ above. To the screw-shafts above the plate $N'$ are fixed separate chain-wheels $N^2$, which are geared together by a chain $N^3$, and one of said wheels is provided with a crank $n$, by turning which all of the screw-shafts are rotated, and the plate $M^2$, with the planer-disk, is adjusted up or down. To impart the necessary rotary motion to the planer-disk and still permit it to be adjusted vertically, the shaft $M'$ is connected to a bevel-gear O (or a band-pulley) above the plate $N'$, which bevel-gear is connected to the shaft by a feather-and-groove or equivalent connection, (see Fig. 6,) that causes the two to rotate together but permits the shaft to rise and fall through the bevelgear. This bevel-wheel O meshes with another one $O'$ on a horizontal shaft $O^2$, which at its outer end has a band-pulley, by which it is driven.

To resist the strain of the cutting action of the upper planer-disk, a bearing-surface in the form of a roller $r$, Fig. 6, or plate is arranged upon the side of the board where the knives leave the board. The motion of the disk keeps the board pressed against this bearing.

Having thus described my invention, what I claim as new is—

1. The combination of the rollers B, having chain-wheels upon their ends, the chain C, surrounding the same, the main shaft or mandrel D, bearing the planer-disk at one end and a friction-pulley at the other, the shaft $F'$, having a friction-wheel at one end engaging the friction-pulley of the mandrel, a chain-wheel $F^2$ driving the chain, a laterally-yielding and vertically-arranged feed-roller I, and a bevel-gear $I^4 I^5$, connecting the same with the shaft $F'$, substantially as shown and described.

2. The planer-disk E, having its outer edge recessed or beveled, and knives having a straight edge $e$ and a right-angular edge $e'$, the said knives being set with their straight edges substantially parallel to the face of the disk and with the right-angular edge projecting into the cut-away portion of the outer periphery of the disk, substantially as shown and described.

3. The planer-disk E, having its outer edge recessed or beveled, knives $E'$, having a right-angular edge projecting into the recessed space, and chisel-shaped knives $E^2$, alternating with the knives $E'$ on the face of the disk, substantially as shown and described.

4. The combination of the planer-disk M, the shaft $M'$, carrying the same, the adjustable plate $M^2$, having a bearing for the said shaft and disk, screw-shafts for adjusting the plate $M^2$, and a toothed gear connected to the shaft $M'$, substantially as described, to rotate it and permit the shaft to slide through it, as set forth.

HIRAM NEWTON BERRY.

Witnesses:
S. B. HOLT,
W. M. STONE.